United States Patent
Schwartzman et al.

(10) Patent No.: US 7,979,884 B1
(45) Date of Patent: Jul. 12, 2011

(54) METHODS AND APPARATUS FOR ALLOWING COMPONENT INTERCHANGEABILITY

(75) Inventors: Alejandro Schwartzman, San Jose, CA (US); Eric Youngman, San Jose, CA (US); Paul Lafferty, Hayward, CA (US); Glenn Lee, Fremont, CA (US); Steven A. Jacobson, Santa Clara, CA (US); Timothy Finan, Milford, NH (US)

(73) Assignee: Cisco Technology, Inc., San Jose, CA (US)

( * ) Notice: Subject to any disclaimer, the term of this patent is extended or adjusted under 35 U.S.C. 154(b) by 1771 days.

(21) Appl. No.: 09/965,525

(22) Filed: Sep. 26, 2001

(51) Int. Cl.
*H04N 7/173* (2011.01)

(52) U.S. Cl. ............ 725/107; 725/38; 725/71; 725/101; 725/111

(58) Field of Classification Search ............ 725/85, 725/111, 107, 150, 151, 101, 38, 71
See application file for complete search history.

(56) References Cited

U.S. PATENT DOCUMENTS

| | | | | |
|---|---|---|---|---|
| 5,910,970 A | * | 6/1999 | Lu | 375/377 |
| 5,983,273 A | * | 11/1999 | White et al. | 709/229 |
| 5,987,061 A | * | 11/1999 | Chen | 375/222 |
| 5,999,563 A | * | 12/1999 | Polley et al. | 375/222 |
| 6,021,158 A | * | 2/2000 | Schurr et al. | 375/211 |
| 6,049,531 A | * | 4/2000 | Roy | 370/395.53 |
| 6,140,822 A | * | 10/2000 | Williams | 324/620 |
| 6,188,669 B1 | * | 2/2001 | Bellenger | 370/230 |
| 6,552,614 B1 | * | 4/2003 | Stetson et al. | 330/285 |
| 6,662,135 B1 | * | 12/2003 | Burns et al. | 702/120 |
| 6,687,489 B1 | * | 2/2004 | Lapid | 455/226.1 |
| 6,724,440 B1 | * | 4/2004 | Suan et al. | 348/731 |
| 7,251,820 B1 | * | 7/2007 | Jost et al. | 725/107 |
| 2002/0141544 A1 | * | 10/2002 | Brown et al. | 379/29.01 |
| 2003/0046690 A1 | * | 3/2003 | Miller | 725/36 |

OTHER PUBLICATIONS

Article printed from website www.howstuffworks.com, entitled "How BIOS Works" by Jeff Tyson, 6 pages, Nov. 6, 2001.

* cited by examiner

*Primary Examiner* — Pankaj Kumar
*Assistant Examiner* — Sahar A Baig
(74) *Attorney, Agent, or Firm* — Weaver Austin Villeneuve & Sampson LLP

(57) ABSTRACT

Methods and apparatus are provided for allowing an operating system to automatically configure and operate multiple types of the same component. According to various embodiments, characteristic information associated with a particular component, such as a tuner, can be written to a nonvolatile memory. An operating system can be configured to read characteristic information from the nonvolatile memory associated with the component. In one example, the characteristic information includes power characteristics associated with the component. By providing characteristic information in a nonvolatile memory, a single version of an operating system can configure and operate many different versions and types of the same component.

28 Claims, 9 Drawing Sheets

METHODS AND APPARATUS FOR ALLOWING COMPONENT INTERCHANGEABILITY

BACKGROUND OF THE INVENTION

1. Field of Invention

The present invention relates generally to cable modem component interchangeability. More particularly, the present invention relates to providing characteristic information in a memory associated with a cable modem tuner to allow the same cable modem operating system version to support different tuners.

2. Description of the Related Art

Conventional cable modems contain a variety of peripheral components along with processors, memory, and peripherals interfaces. One example of the peripheral component is a tuner. Cable modems use tuners to receive and transmit data onto a network, typically a hybrid fiber/coaxial network. A cable modem is typically coupled with a network node such as a server or client system. The cable modem allows the server or client system to communicate with other network nodes in a network through a cable modem termination system. To allow communication through a cable modem termination system, the cable modem and the cable modem termination system typically are configured to communicate characteristic information. One piece of information is a frequency or range of frequencies used for data transmissions. The cable modem termination system and the cable modem can also communicate transmission power characteristics.

Many different tuners can be used in a cable modem. Although the many tuners may have similar features and capabilities, the tuners may also have unique and particular characteristics. In one example, a variety of different tuners may be configured to operate in a common range of radio frequencies. However, tuner components may only work with specific internal cable modem frequencies. A cable modem operating system typically uses knowledge of specific characteristics of a tuner during initialization to allow configuration of other components as well as to allow communication with a cable modem termination system.

Because tuners have unique and particular characteristics, a cable modem operating system typically is specifically coded to work with one particular tuner. Once a cable modem operating system is coded, the tuner component is fixed. That is, a different tuner cannot work with the cable modem unless the cable modem operating system itself is changed. This prevents the ability to take advantage of different or new tuners that may be associated with benefits such as lower cost or higher durability. Consequently, it is desirable to provide improved techniques for allowing cable modem component interchangeability.

SUMMARY OF THE INVENTION

Methods and apparatus are provided for allowing an operating system to automatically configure and operate multiple types of the same cable modem component. According to various embodiments, characteristic information associated with a particular component, such as a tuner, can be written to a nonvolatile memory. An operating system can be configured to read characteristic information from the nonvolatile memory associated with the component. In one example, the characteristic information includes power characteristics associated with the component. By providing characteristic information in a nonvolatile memory, a single version of an operating system can configure and operate many different versions and types of the same component.

In one embodiment, a method for an operating system to operate a system component is provided. The operating system may be configurable to drive a plurality of system components. A component is identified. Parameter information comprising power characteristics of the component are obtained from nonvolatile memory. The component is characterized using the parameter information. The characterization allows the operating system to operate the identified component.

In various embodiments, the system can be a cable modem and the component can be a cable modem tuner. Operating the component can include varying the RF transmission power. The parameter information can include IF output information, band crossover frequency information, IF and RF AGC Gain Threshold information, and component address information.

In another embodiment, a method for a cable modem operating system to drive a tuner is provided. The operating system may be configurable to drive a plurality of different tuners. Parameter information associated with a tuner is obtained from a nonvolatile memory. The tuner is characterized using the parameter information. The characterization allows the cable modem operating system to drive the tuner.

In still another embodiment, a method for providing parameter information associated with a tuner to an operating system is provided. Parameter information associated with a tuner is identified. Parameter information associated with the tuner is written into a nonvolatile memory. The nonvolatile memory is configured to provide parameter information to an operating system to allow the operating system to drive the tuner.

In yet another embodiment, a cable modem is provided. The cable modem includes a tuner and a nonvolatile memory containing parameter information associated with the tuner. The parameter information is provided to an operating system to allow the operating system to drive the tuner.

Other embodiments of the invention pertain to computer program products including machine readable mediums on which is stored program instructions, tables or lists, and/or data structures for implementing a method as described above. Any of the methods, tables, or data structures of this invention may be represented as program instructions that can be provided on such computer readable media.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Methods and apparatus are provided to allow component interchangeability in a cable modem running a cable modem operating system. In conventional cable modems, a cable modem operating system, such as Cisco IOS, is hard-coded to work with specific tuners. In order to hard-code the tuners, however, the specifications of the specific tuners must be known and characterized prior to release of the product for manufacturing. Although other tuners may have similar features and capabilities and can easily be physically integrated into a cable modem, tuners typically have unique and incompatible characteristic information. Some characteristics relate to downstream transmission from a cable modem termination system to a cable modem. Other characteristics relate to downstream power monitoring. Still other characteristics relate to upstream power reporting. The operating system uses these characteristics to initialize a tuner and a cable modem.

In conventional systems, the operating system is hard coded with the characteristic information specific to the tuner. In order to accommodate a new or different tuner, a new version of the operating system typically has to be introduced with the new hard coded characteristic information. However, introducing a new operating system version raises compatibility and compliance issues. Techniques of the present invention provide that a memory associated with the cable modem component, such as a tuner, is provided in a cable modem. According to various embodiments, the memory is a nonvolatile memory. As will be appreciated by one of skill in the art, nonvolatile memory is a general term including all forms of solid-state memory that do not have the memory contents periodically refreshed. Some examples of nonvolatile memory are read-only memory and flash memory. Another example of nonvolatile memory is random access memory that is powered with an independent power source such as a battery.

Characteristic information associated with the cable modem component such as an RF tuner, can be written onto a nonvolatile memory. In one example, the cable modem operating system can be configured to acquire tuner characteristic information from the nonvolatile memory. The operating system no longer needs to be hard coded with specific tuner characteristics or supplemented with additional code such as a tuner specific device driver. When a new tuner is selected for use with a current operating system, a nonvolatile memory associated with the tuner can be programmed and provided in the cable modem along with the tuner. A more general device driver can be used. No new version of the operating system is required. The existing version of the operating system can access characteristic information associated with the tuner by reading the nonvolatile memory. Compliance and compatibility concerns are addressed by maintaining the same version of the operating system, without new software additions such as new device drivers.

Figure 1:
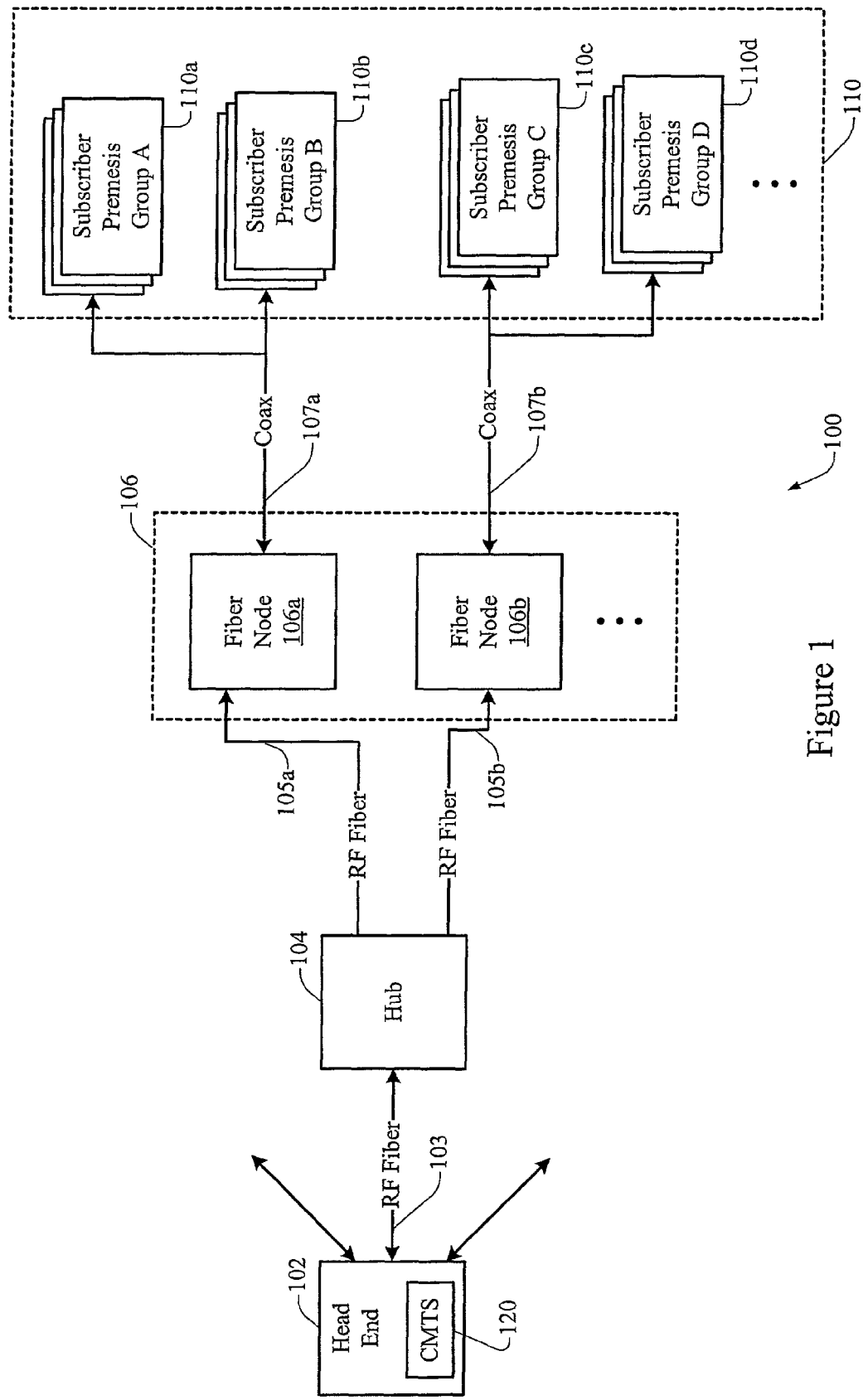
FIG. 1 is a diagrammatic representation of a system that can use the techniques of the present invention.

FIG. 1 is a diagrammatic representation of one example of a system that can use the techniques of the present invention. A cable network 100 includes a cable network head end 102 that provides a communication interface between cable modems in the cable network and external nodes. The cable modems typically reside at the subscriber premises 110a-d. In order to operate properly, a cable modem operating system uses information such as downstream tuner characteristics, downstream power monitoring characteristics, and upstream power monitoring characteristics to initialize cable modem and cable modem tuner operation in the network.

The cable modem tuner is configured to communicate with the cable network head end 102. Each cable network head end 102 is typically connected to one or more hubs 104. Each hub is configured to service one or more fiber nodes 106 in the cable network. Each fiber node is, in turn, configured to service one or more subscriber groups 110. A primary function of the fiber nodes 106 is to provide an optical-electronic signal interface between the cable network head end 102 and the plurality of cable modems residing at the plurality of subscriber groups 110.

Communication between the cable network head end 102, hub 104, and fiber node 106a is typically implemented using modulated optical signals that travel over fiber optic cables. More specifically, during the transmission of modulated optical signals, multiple optical frequencies are modulated with data and transmitted over optical fibers such as, for example, optical fiber links 103 and 105a and 105b are typically referred to as "RF fibers".

The modulated optical signals transmitted from the cable network head end 102 eventually terminate at the fiber node 106a. The fiber nodes maintain the RF modulation during conversion between fiber and coax media.

Figure 2:
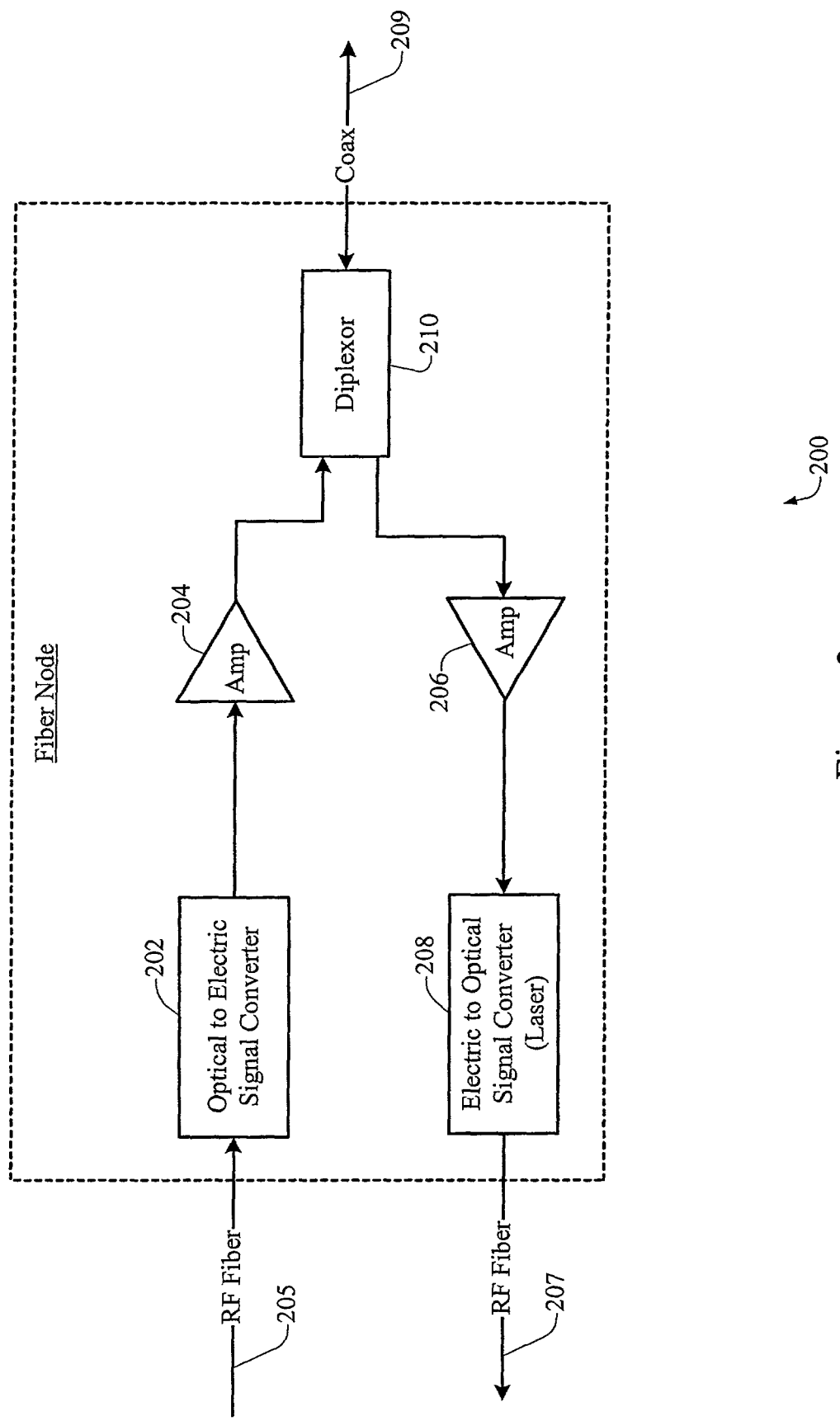
FIG. 2 is a diagrammatic representation of fiber node.

FIG. 2 is a diagrammatic representation of one example of a conventional fiber node 106a of FIG. 1. In conventional cable networks, the fiber node 200 is responsible for converting RF modulated wavelength optical signals into electrical signals and vice versa. The RF modulated optical signals enter the fiber node 200 via downstream RF fiber 205, and are converted into electric signals by the optical-to-electric signal converter 202. The electrical signals are then amplified by downstream amplifier 204. The amplified electric signals are then passed to a diplexor 210 that transmits the electric signals over the coaxial line 209 to the plurality of cable modems.

In the reverse direction, the cable modems transmit electrical signals via the coaxial line 209 to the fiber node 200. The upstream electrical signals from the cable modems are received at the diplexor 210, and passed to the upstream amplifier 206. The upstream electrical signals are then passed from the amplifier 206 to an electric-to-optical signal converter 208, which converts the upstream electric signals into radio frequency wavelength modulated optical signals which are then transmitted to the cable network head end via upstream RF fiber 207.

Figure 3:
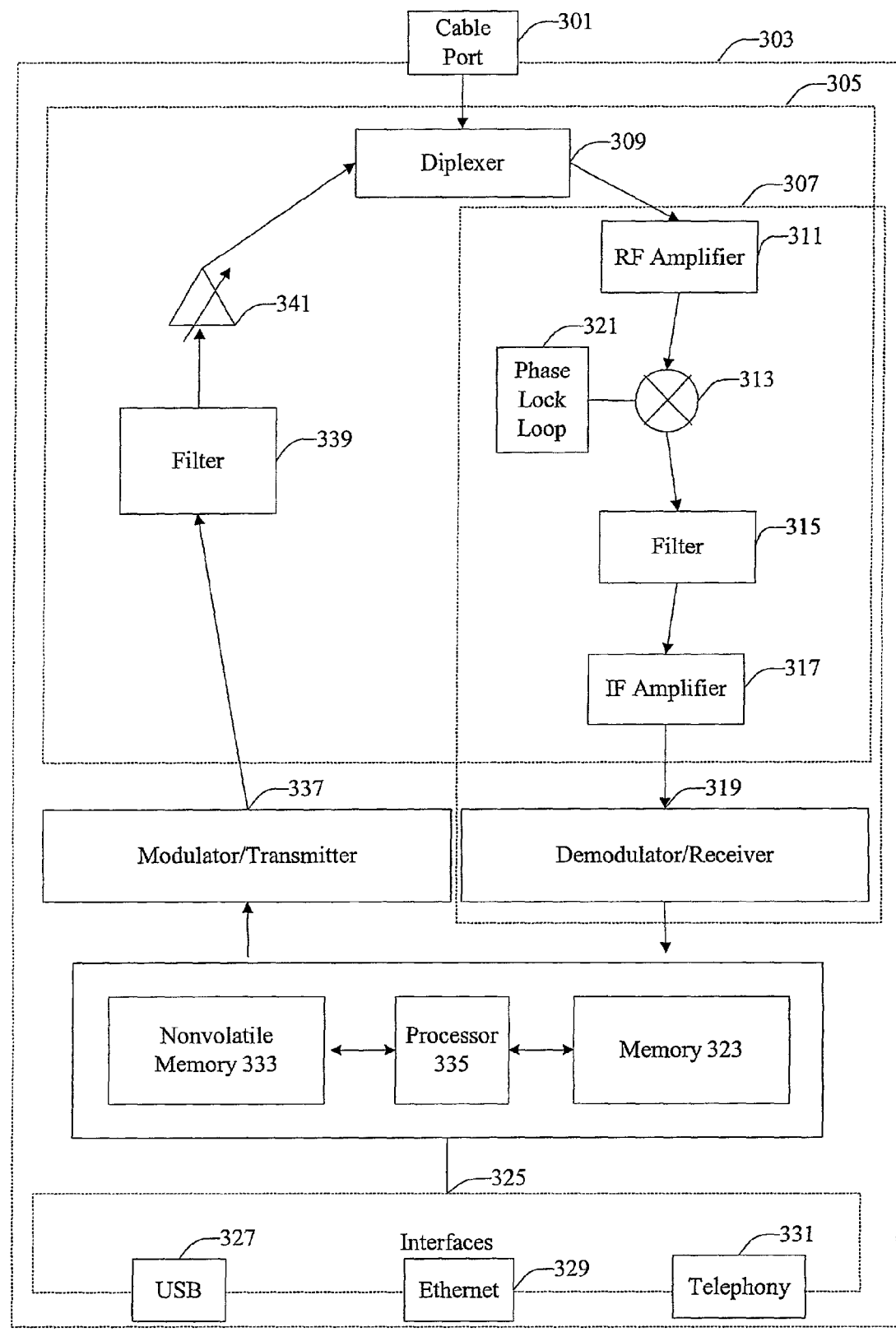
FIG. 3 is a diagrammatic representation of cable modem containing nonvolatile memory.

FIG. 3 is a diagrammatic representation of a cable modem that can allow interchangeable tuners. According to specific embodiments, a nonvolatile memory 333 associated with a tuner 305 provides tuner characteristic information to a cable modem operating system running on a processor 335. A cable modem operating system can be configured to read cable modem tuner characteristics from the nonvolatile memory 333 instead of having cable modem tuner characteristics hard coded into the operating system. By having the operating system read tuner characteristics from a nonvolatile memory 333, the version of the operating system does not need to change when a different tuner is used.

According to specific embodiments, a cable modem 303 has a cable port 301 to connect the cable modem with a headend. It also has a tuner 305, modulator 337, demodulator 319, processor 335, memory 323, and USB 327, Ethernet 329, or telephony 331 ports to connect the cable modem to client hardware. It should be noted that multiple components of a cable modem may be contained in a single integrated circuit, or may be a combination of digital and analog circuitry. According to various embodiments, the tuner 305 is a separate component associated with a nonvolatile memory 333.

Tuner 305 typically includes an upstream circuit for transmitting data to a headend and a downstream circuit for receiving data from the headend. The tuner can accommodate both functions through a diplexer connected to a single cable port. Downstream data sent to the cable modem from a headend is amplified using an RF amplifier 311. RF amplifier 311 is connected to a mixer 313 coupled with a phase lock loop 321. The phase lock loop 321 coupled with the mixer 313 selects a channel and converts the RF signal into an IF signal. The IF signal is passed through a filter 315 and amplified by an IF amplifier 317. The IF signal is introduced into a demodulator/receiver 319. The demodulator/receiver 319 contains components for analog to digital conversion, demodulation, frame synchronization, and error correction.

The downstream data transmission is then passed to a processor 335 connected to memory 323. A processor 335 may be a general purpose CPU or a specially configured ASIC. According to specific embodiments, the processors encapsulate and decapsulate packets within a MAC header, preferably according to the DOCSIS standard for transmission of data or other information. The encapulation and decapsulation can be performed by processor 335 coupled with memory 323 or by special purpose MAC hardware. The transmission is then passed to local interface 325 comprising ports supporting protocols and standards such as USB, Ethernet, PCI, and telephony.

A client wishing to send data upstream through the cable modem does so through interface 325. The packets are processed and encapsulated by processor 335 coupled with memory 323 and passed to the upstream modulator/transmitter 337. The processor 335 can also time the transmissions of the upstream bursts. The modulator/transmitter encodes the data, modulates the data onto a selected frequency, and converts the signal from digital to analog. The signal is filtered at 339 and passed on to a variable reverse amplifier 341 before transmitting the signal through diplexer 309 onto the cable network.

The transmitter circuitry of the cable modem typically has variable reverse amplifier 341, filter 339, and the modulator/transmitter 337. Cable modems can also have enable and disable functionality for transmitter circuitry. The transmit enable and disable states allow the cable modem to put the transmitter circuitry in standby mode, so that the cable modem consumes less power when no data needs to be transmitted to the headend.

Receiver circuitry 307 of the cable modem contains RF amplifier 311, phase lock loop 321, mixer 313, filter 315, and IF amplifier 317. Receiver circuitry 307 can additionally comprise processors, memory, and MAC hardware.

Figure 4:
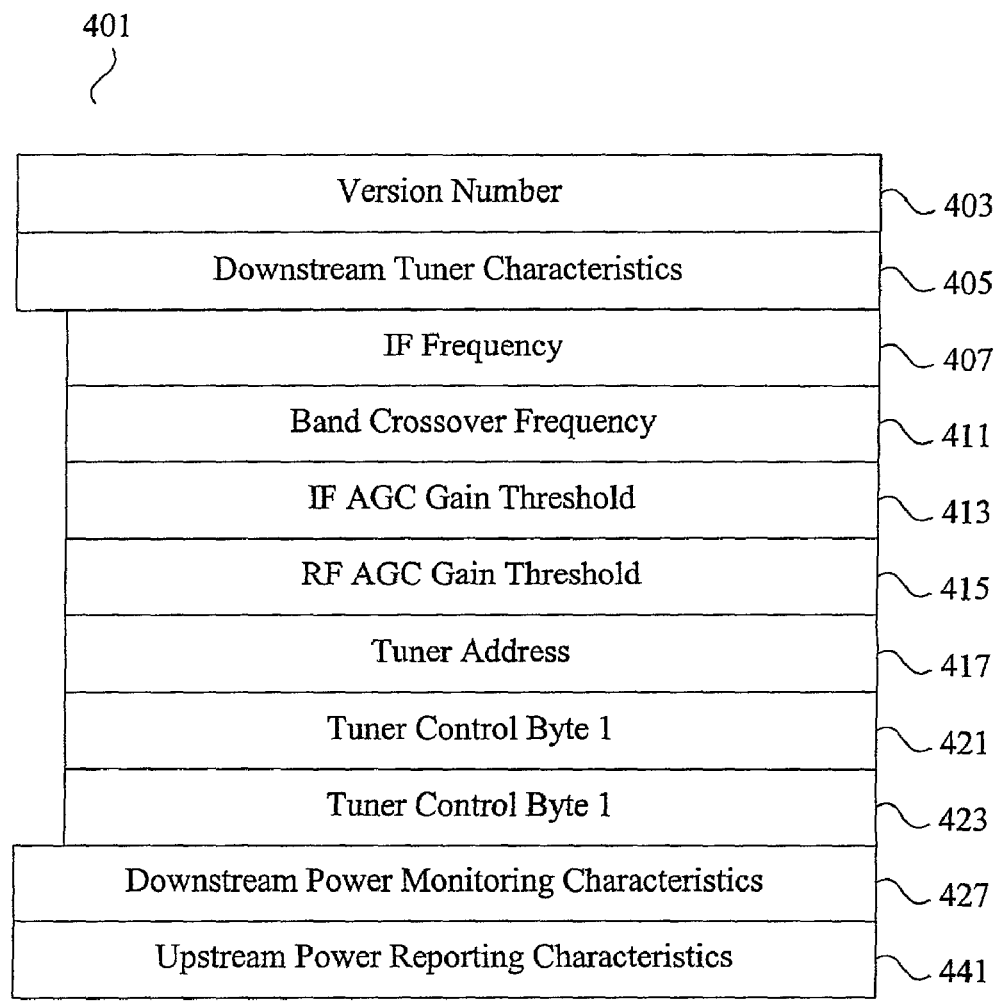
FIG. 4 is a diagrammatic representation of table showing characteristic information associated with a cable modem tuner.

FIG. 4 is a diagrammatic representation of a tuner characteristic information table 401 that can be maintained in a nonvolatile memory of a cable modem, such as the cable modem described above. As will be appreciated by one of skill in the art, characteristic information can be maintained in a variety of formats such as lists, arrays, ordered bytes, etc. A table representation is provided in FIG. 4 as one illustrative example. As noted above, a cable modem operating system uses tuner characteristics to configure and initialize a cable modem in a cable network. In one embodiment, the tuner characteristic information table includes the version number 403, downstream tuner characteristics 405, downstream power monitoring characteristics 427, and upstream power reporting characteristics 441. It will be appreciated that the characteristic information table can include additional values as well as exclude certain unused values.

The characteristic information table can contain a version number 403. The version number 403 can be provided for internal use to identify specific structures. In one example, the version number 403 may change when tuner characteristics are moved in a characteristics information table 401. Downstream tuner characteristics 405 can include an IF frequency 407, a band crossover frequency 411, an IF AGC gain threshold 413, an RF AGC gain threshold 415, a tuner address 417, and tuner control bytes 421 and 423. The IF frequency 407 is provided to the modulator and a demodulator during configuration to allow communication with the tuner. Different tuners may use various IF frequencies. Providing the IF frequency 407 in the table 401 allows a cable modem operating system to support a variety of different IF frequencies. A band crossover frequency 411 specifies the transition frequencies between VHF low, VHF high, and UHF. A cable modem typically can function over several different bands. The band crossover frequencies 411 specify the transition frequencies between the different bands. A cable modem operating system may need to know the current band the cable modem is operating in because different values are written to the tuner itself. In one example, when the cable modem transitions from VHF low to VHF high, different control bytes 421 and 423 with different bit patterns can be written by the cable modem operating system to the tuner. The transition frequencies provide information for when different values should be written.

The IF AGC Gain Threshold 413 and the RF AGC Gain Threshold 415 specify loop transition information. The tuner address 417 is the address of the tuner on a bus coupling the various components in a cable modem. According to various embodiments, the bus is an IIC bus. It should be noted that use of a tuner characteristic table also allows the use of multiple tuners in a single cable modem. The tuner control bytes 421 and 423 provide information for controlling the specific tuner in various operating bands.

The tuner characteristic information table 401 can also include downstream power monitoring characteristics 427. Downstream power monitoring characteristics 427 can include the number of frequency samples taken, the definition of sample points, the number of power samples used, the definitation of the power samples. According to various embodiments, the information can be provided in a two-dimensional table integrated with the tuner characteristic information table 401. The tuner characteristic information table 401 can also include upstream power reporting characteristics 441. As will be appreciated by one of skill in the art, various types of tuners can have different saturation and rolloff properties. Values for informing the cable modem operating system of attenuation across both power and frequency as well as rolloff across both power and frequency can be provided in the tuner characteristic information table 401. Power characteristics are discussed in more detail below.

Figure 5:
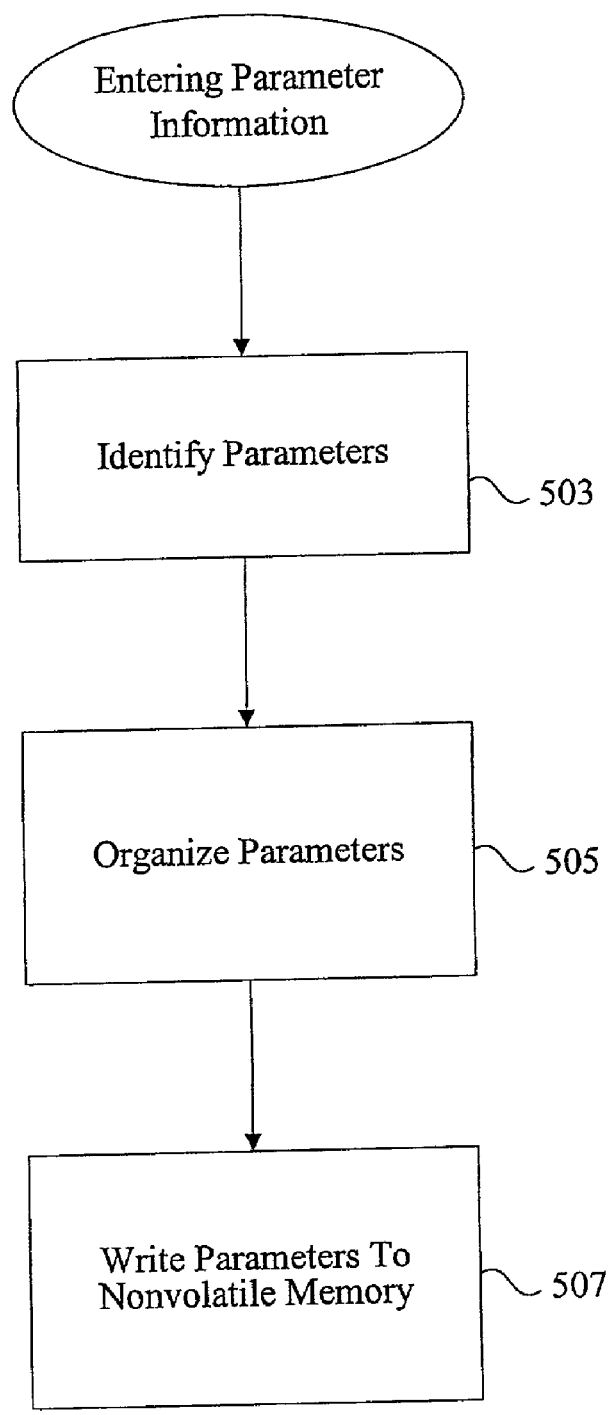
FIG. 5 is a process flow diagram depicting a process for entering parameter information into nonvolatile memory.

FIG. 5 is a process flow diagram depicting the introduction of characteristic information into a nonvolatile memory. At 503, parameters associated with the cable modem tuner can be identified. As will be appreciated by one of skill in the art, tuner parameters can be obtained from a tuner specification. At 505, the tuner parameters can be organized and written into a nonvolatile memory at 507.

Figure 6:
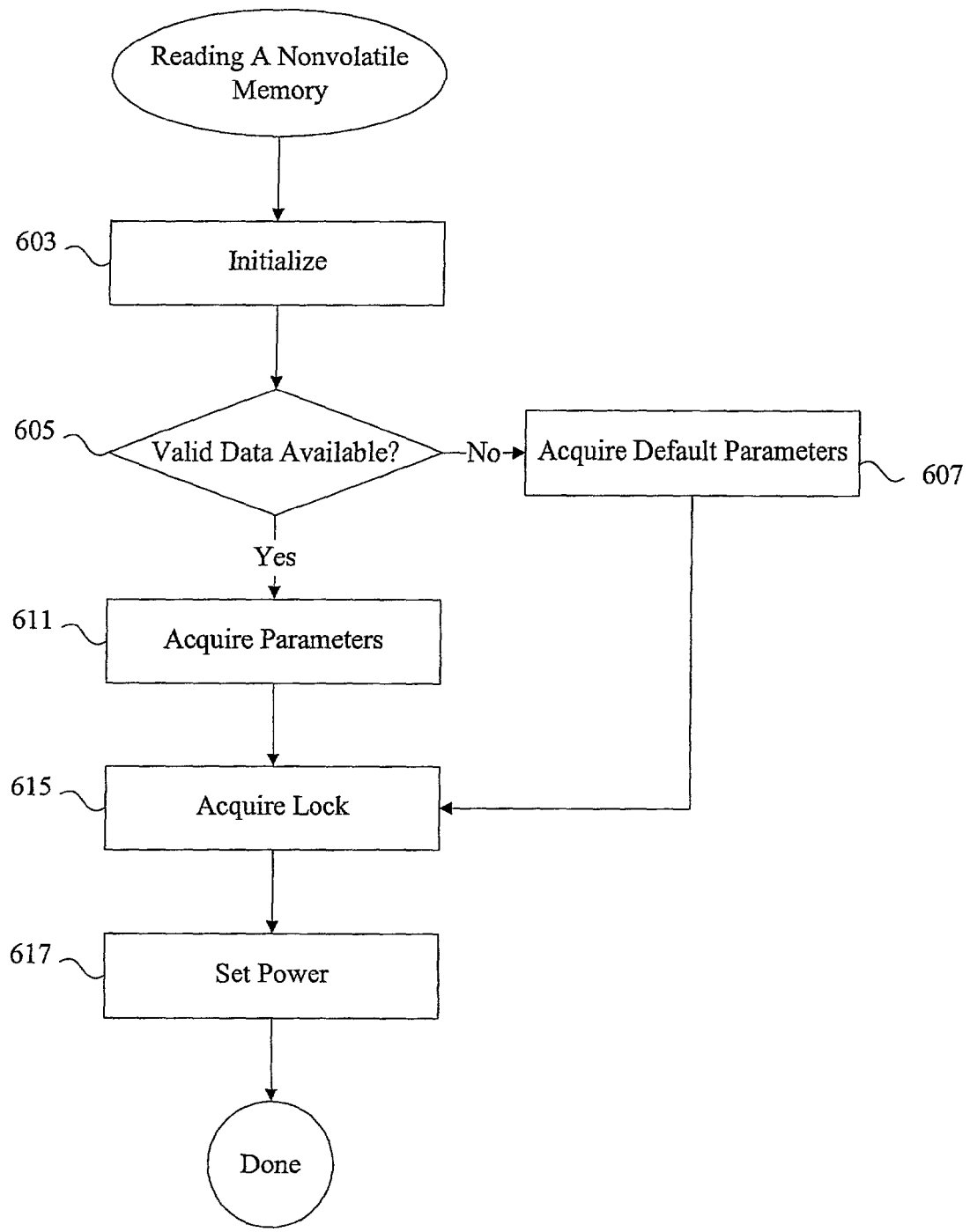
FIG. 6 is a process flow diagram showing the reading of a nonvolatile memory associated with a tuner.

FIG. 6 is a diagrammatic representation depicting the cable modem operating system accessing a nonvolatile memory to acquire cable modem tuner characteristics. The nonvolatile memory is typically accessed during power on, reboot, modem configuration update, or a clear interface command initiated by a user at 603. At 605, the cable modem operating system checks if any valid data is available in a nonvolatile memory associated with the tuner. If it is determined that no valid data is available, default information can be accessed at 607.

According to various embodiments, the default information can be contained in hard coded parameters in the cable modem operating system, a device driver, or it may be contained in a nonvolatile memory. If it is determined that valid data is available in a nonvolatile memory, a cable modem operating system acquires tuner characteristics associated with parameters such as downstream tuner values, downstream power monitoring, and upstream power reporting at 611. After the cable modem is initialized, the cable modem can acquire a frequency lock with the cable modem termination system at 615. As will be appreciated by one of skill in the art, acquiring a frequency lock allows the cable modem to communicate with the cable modem termination system over a certain frequency. The cable modem can also set upstream and downstream transmission power at 617. Using information from a nonvolatile memory, the cable modem operating system can accurately perform tasks such as upstream power reporting.

Figure 7:
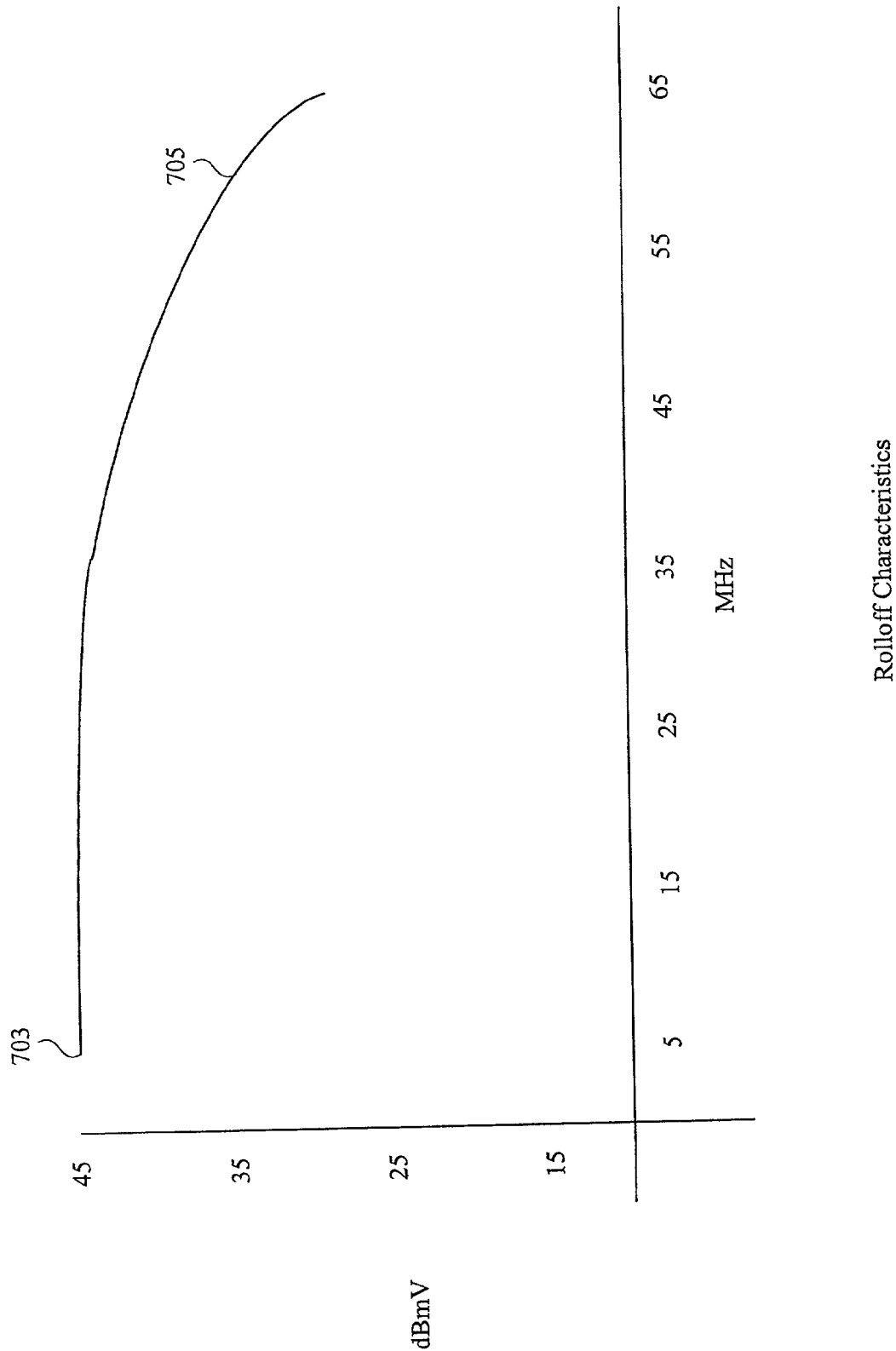
FIG. 7 is a diagrammatic representation of roll off power characteristics

FIG. 7 is a graphical representation showing rolloff characteristics a cable modem tuner may have. As will be appreciated by one of skill in the art, a cable modem reports upstream signal power to a cable modem termination system. Different tuners, however, have different signal power characteristics. In one example, a cable modem operating system may instruct the tuner to transmit a 50 dBmV signal. However, because of the power characteristics of the tuner, the signal transmitted may actually be a 45 dBmV signal.

A cable modem may have to adjust values reported to a cable modem termination system. FIG. 7 shows rolloff characteristics that may be one reason why a transmitted signal differs from an intended signal. In one example, a cable modem tuner may be instructed to transmit a 45 dBmV signal at 5 MHz to a cable modem termination system. The resulting signal is actually 45 dBmV at 703. However, if the cable of tuner is instructed to transmit a 45 dBmV signal at 60 MHz, the resulting signal power may only be 35 dBmV at 705. A rolloff results typically because an upstream amplifier does not have linear characteristics across all frequency settings. Non-ideal power characteristics result from rolloff, but non-ideal characteristics can also result from other properties, such as saturation.

Figure 8:
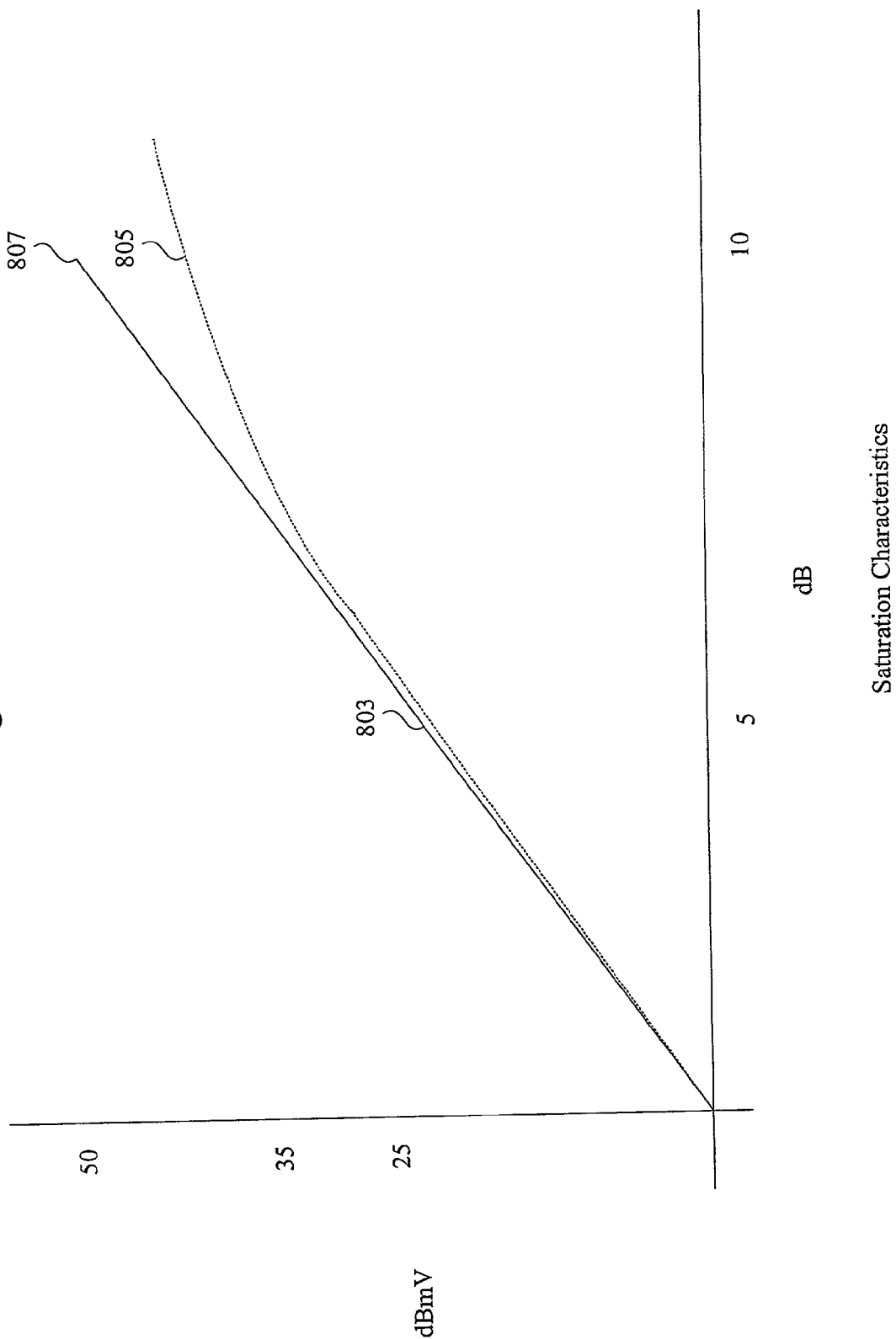
FIG. 8 is a diagrammatic representation of saturation power characteristics.

FIG. 8 is a graphical representation depicting saturation characteristics that may be associated with a tuner. Typical upstream amplifiers may not show linear characteristics across power settings. A cable modem operating system typically takes into account power characteristics such as saturation during upstream power reporting. At 5 dB, the actual output power level is close to the expected 35 dBmV power level at 803. However, at 10 dB, the actual output power level at 805 is substantially different than the expected power output of 50 dBmV at 807. As will be appreciated by one of skill in the art, a variety of power characteristics may be reported to a cable modem termination system. Some examples of power characteristics are amplifier power saturation, amplifier frequency rolloff, attenuation by power, and attenuation by frequency.

A cable modem operating system can take into account power characteristics stored in a nonvolatile memory associated with the tuner to allow accurate reporting to a cable modem termination system. Alternatively, the cable modem operating system can also use power characteristics to more efficiently and effectively reach a desired signal power level. For example, the cable modem can use rolloff characteristics to adjust the signal power level to more closely correspond with an expected signal power level. If the desired signal power level is 35 dBmV at 60 MHz, the cable modem tuner may be instructed to send a signal of 37 dBmV in order to actually transmit a desired signal power level of 35 dBmV.

The present invention for allowing component interchangeability can be implemented in a variety of communication devices. In one example, the techniques can be implemented in a cable modem coupled with a cable modem termination system. In various embodiments, this is implemented in high bandwidth networks such as a cable network or a satellite network. In the context of a cable network, the invention can be implemented in a cable modem coupled with a cable modem termination system, such as Cisco 6920 Rate-Mux® available from Cisco Systems, Inc, or in a line card of a cable modem headend such as the Cisco UBR 7200 also available from Cisco Systems, Inc.

Figure 9:
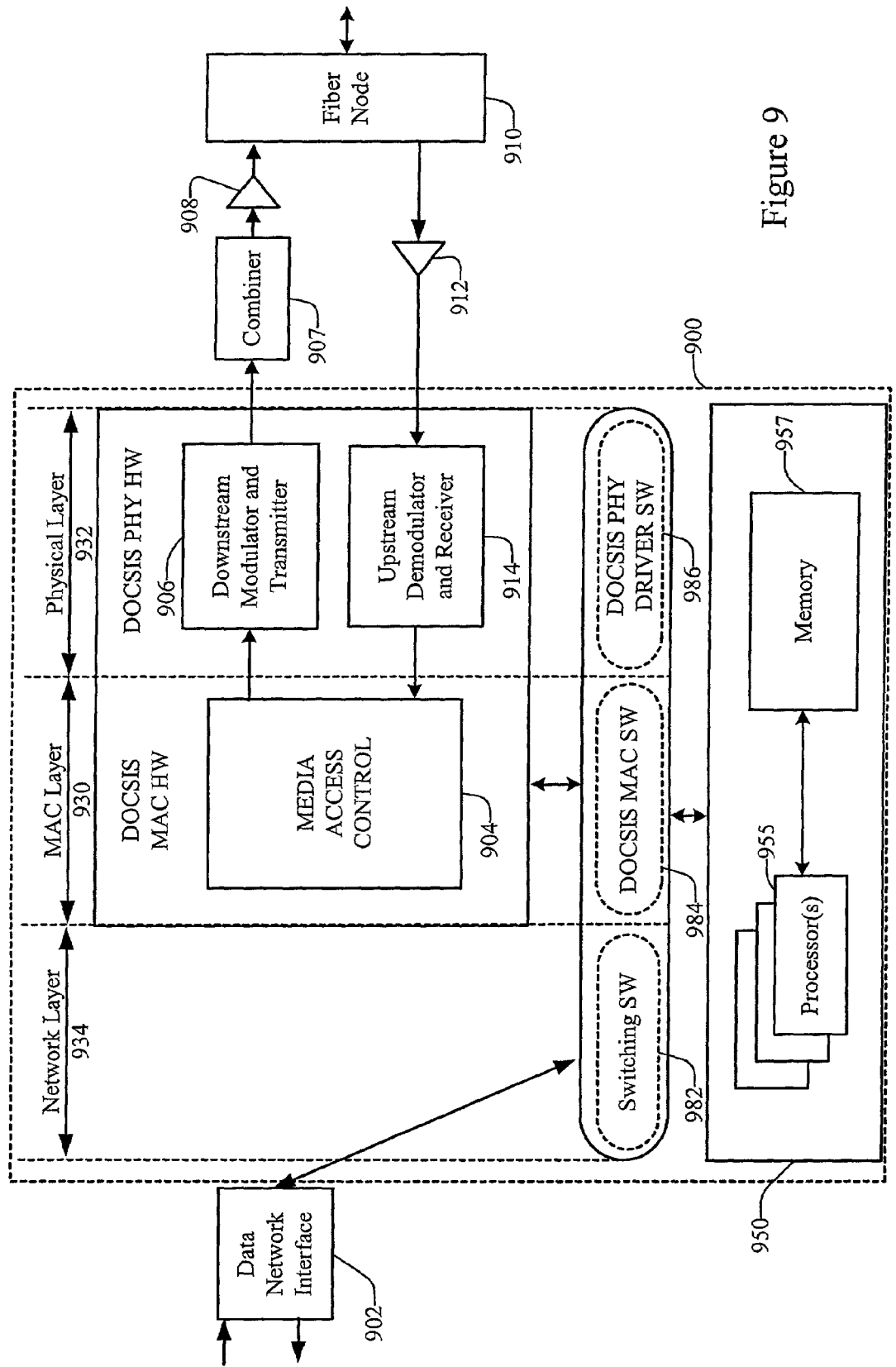
FIG. 9 is a diagrammatic representation of a cable modem termination system that can be used with the techniques of the present invention.

FIG. 9 depicts the basic components of a cable modem headend that can be coupled with a cable modem. A Data Network Interface 902 is an interface component between an external data source and the cable system. External data sources transmit data to data network interface 902 via optical fiber, microwave link, satellite link, or through various other media. Also as mentioned above, a Media Access Control Block (MAC Block) 904 receives data packets from a Data Network Interface 902 and encapsulates them with a MAC header.

In a specific embodiment as shown in FIG. 9, CMTS 900 provides functions on three network layers including a physical layer 932, a Media Access Control (MAC) layer 930, and a network layer 934. Generally, the physical layer is responsible for receiving and transmitting RF signals on the cable plant. Hardware portions of the physical layer include a downstream modulator and transmitter 906 and an upstream demodulator and receiver 914. The physical layer also includes software 986 for driving the hardware components of the physical layer.

Once an information packet is demodulated by the demodulator/receiver 914, it is then passed to MAC layer 930. A primary purpose of MAC layer 930 is to encapsulate and decapsulate packets within a MAC header, preferably according to the above-mentioned DOCSIS standard for transmission of data or other information.

MAC layer 930 includes a MAC hardware portion 904 and a MAC software portion 984, which function together to encapsulate information packets with the appropriate MAC address of the cable modem(s) on the system. After the upstream information has been processed by MAC layer 930, it is then passed to network layer 934. Network layer 934 includes switching software 982 for causing the upstream information packet to be switched to an appropriate data network interface on data network interface 902.

When a packet is received at the data network interface 902 from an external source, the switching software within network layer 934 passes the packet to MAC layer 930. MAC block 904 transmits information via a one-way communication medium to downstream modulator and transmitter 906. Downstream modulator and transmitter 906 takes the data (or other information) in a packet structure and converts it to modulated downstream frames, such as MPEG or ATM frames, on the downstream carrier using, for example, QAM 64 modulation (other methods of modulation can be used such as CDMA (Code Division Multiple Access) OFDM (Orthogonal Frequency Division Multiplexing), FSK (FREQ Shift Keying)). The return data is likewise modulated using, for example, QAM 16 or QSPK. Data from other services (e.g. television) is added at a combiner 907. Converter 908 converts the modulated RF electrical signals to optical signals that can be received and transmitted by a Fiber Node 910 to the cable modem hub.

It is to be noted that alternate embodiments of the CMTS (not shown) may not include network layer 934. In such embodiments, a CMTS device may include only a physical layer and a MAC layer, which are responsible for modifying a packet according to the appropriate standard for transmission of information over a cable modem network. The network layer 934 of these alternate embodiments of CMTS devices may be included, for example, as part of a conventional router for a packet-switched network.

In a specific embodiment, the network layer of the CMTS is configured as a cable line card coupled to a standard router that includes the physical layer 932 and MAC layer 930. Using this type of configuration, the CMTS is able to send and/or receive IP packets to and from the data network interface 902 using switching software block 982. The data network interface 902 is an interface component between external data sources and the cable system. The external data sources transmit data to the data network interface 902 via, for example, optical fiber, microwave link, satellite link, or through various media. The data network interface includes hardware and software for interfacing to various networks such as, for example, Ethernet, ATM, frame relay, etc.

As shown in FIG. 9, the CMTS includes a hardware block 950 including one or more processors 955 and memory 957. These hardware components interact with software and other hardware portions of the various layers within the CMTS. Memory 957 may include, for example, I/O memory (e.g. buffers), program memory, shared memory, etc. Hardware block 950 may physically reside with the other CMTS components.

Because such information and program instructions may be employed to implement the systems/methods described herein, the present invention relates to machine readable media that include program instructions, state information, etc. for performing various operations described herein. Machine readable media may contain instructions for programming tuner characteristics onto a nonvolatile memory. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). Aspects of the invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of communication protocols and should not be restricted to the ones mentioned above. For example, the headend has a variety of embodiments, which include a cable modem termination system coupled to a router or a multicast router. A cable modem can also be a separate entity or entirely integrated into a client system. Therefore, the scope of the invention should be determined with reference to the appended claims.

What is claimed is:

1. A method, comprising:
    identifying a component included in a cable modem, wherein the component is a first tuner selected from a plurality of tuners included in the cable modem;
    obtaining parameter information including downstream power monitoring characteristics, band crossover frequency, tuner control bytes, and upstream power reporting characteristics for the first tuner from a tuner characteristic table maintained in nonvolatile memory;
    configuring the operating system running on the cable modem to operate the component and report power characteristics to an upstream device, wherein the upstream device is a cable modem head end;
    obtaining parameter information including downstream power monitoring characteristics, band crossover frequency, tuner control bytes, and upstream power reporting characteristics for a second tuner selected from a plurality of tuners included in the cable modem;
    configuring the operating system to operate the second tuner and report power characteristics from the cable modem to the upstream device.

2. The method of claim 1, wherein the operating system is a cable modem operating system.

3. The method of claim 1, wherein operating the component comprises varying RF transmission power.

4. The method of claim 1, wherein parameter information comprises IF output information.

5. The method of claim 1, wherein parameter information comprises band crossover frequency information.

6. The method of claim 1, wherein parameter information comprises IF AGC Gain Threshold information.

7. The method of claim 1, wherein parameter information comprises RF AGC Gain Threshold information.

8. The method of claim 1, wherein parameter information comprises component address information.

9. A system, comprising:
    means for identifying a component included in a cable modem, wherein the component is a first tuner selected from a plurality of tuners included in the cable modem;
    means for obtaining parameter information including downstream power monitoring characteristics, band crossover frequency, tuner control bytes, and upstream power reporting characteristics for the first tuner from a tuner characteristic table maintained in nonvolatile memory;
    means for configuring the operating system running on the cable modem to operate the component and report power characteristics to an upstream device, wherein the upstream device is a cable modem head end;
    means for obtaining parameter information including downstream power monitoring characteristics, band crossover frequency, tuner control bytes, and upstream power reporting characteristics for a second tuner selected from a plurality of tuners included in the cable modem;

means for configuring the operating system to operate the second tuner and report power characteristics from the cable modem to the upstream device.

10. The system of claim 9, wherein the component is a cable modem tuner.

11. The system of claim 10, wherein operating the component comprises varying RF transmission power.

12. The system of claim 10, wherein parameter information comprises IF output information.

13. The system of claim 10, wherein parameter information comprises band crossover frequency information.

14. The system of claim 10, wherein parameter information comprises IF AGC Gain Threshold information.

15. The system of claim 10, wherein parameter information comprises RF AGC Gain Threshold information.

16. The system of claim 10, wherein parameter information comprises component address information.

17. A non-transitory computer readable storage medium having computer code embodied therein, the non-transtitory computer readable storage medium comprising:
   computer code for identifying a component included in a cable modem, wherein the component is a first tuner selected from a plurality of tuners included in the cable modem;
   computer code for obtaining parameter information including downstream power monitoring characteristics, band crossover frequency, tuner control bytes, and upstream power reporting characteristics for the first tuner from a tuner characteristic table maintained in nonvolatile memory;
   computer code for configuring the operating system running on the cable modem to operate the component and report power characteristics to an upstream device, wherein the upstream device is a cable modem head end;
   computer code for obtaining parameter information including downstream power monitoring characteristics, band crossover frequency, tuner control bytes, and upstream power reporting characteristics for a second tuner selected from a plurality of tuners included in the cable modem;
   computer code for configuring the operating system to operate the second tuner and report power characteristics from the cable modem to the upstream device.

18. The non-transitory computer readable storage medium of claim 17, wherein the operating system is a cable modem operating system.

19. The non-transitory computer readable storage medium of claim 18, wherein the component is a tuner.

20. The non-transitory computer readable storage medium of claim 19, wherein operating the component comprises varying RF transmission power.

21. The non-transitory computer readable storage medium of claim 19, wherein parameter information comprises IF output information.

22. The non-transitory computer readable storage medium of claim 19, wherein parameter information comprises band crossover frequency information.

23. The non-transitory computer readable storage medium of claim 19, wherein parameter information comprises IF AGC Gain Threshold information.

24. The non-transitory computer readable storage medium of claim 19, wherein parameter information comprises RF AGC Gain Threshold information.

25. The non-transitory computer readable storage medium of claim 19, wherein parameter information comprises component address information.

26. A cable modem comprising:
   a plurality of tuners;
   a nonvolatile memory operable to store power characteristics including power monitoring characteristics, band crossover frequency, tuner control bytes, and upstream power reporting characteristics included in a tuner characteristic table associated with the tuner;
   a volatile memory operable to temporarily maintain power characteristics;
   a processor operable to run a cable modem operating system, wherein the cable modem operating system is configured to select a first tuner from the plurality of tuners included in the cable modem and use the power characteristics to drive the first tuner to transmit at a desired power level, wherein the operating system accesses nonvolatile memory to obtain power characteristics to drive a second tuner included in the cable modem to operate in a different frequency band.

27. The cable modem of claim 26, wherein the tuner characteristic table is configured to hold a version number, downstream tuner characteristics, IF frequency, band crossover frequency, IF AGC gain threshold, RF AGC gain threshold, tuner address, tuner control bytes, downstream power monitoring characteristics, and upstream power reporting characteristics for the plurality of tuners included in the cable modem.

28. The cable modem of claim 27, wherein the first tuner is a cable modem RF tuner.

\* \* \* \* \*